United States Patent [19]

Kiyoura et al.

[11] Patent Number: 5,600,615
[45] Date of Patent: Feb. 4, 1997

[54] DEVICE AND METHOD FOR AUTOMATICALLY CONTROLLING A SERVO LOOP GAIN

[75] Inventors: Kazuhiro Kiyoura; Yoshifumi Fujino; Alex Bradshaw; Takashi Sasaki; Koichiro Haraguchi; Takeshi Matsumoto, all of Kawagoe, Japan

[73] Assignee: Pioneer Electronic Corporation, Tokyo-to, Japan

[21] Appl. No.: 333,326

[22] Filed: Nov. 2, 1994

[30] Foreign Application Priority Data

Nov. 4, 1993 [JP] Japan .................................. 5-275181

[51] Int. Cl.[6] ..................................................... G11B 7/095
[52] U.S. Cl. ...................................... 369/44.35; 369/44.36
[58] Field of Search .............................. 369/44.35, 44.36, 369/54, 44.29; 360/77.01, 77.03, 77.04

[56] References Cited

U.S. PATENT DOCUMENTS

| | | | |
|---|---|---|---|
| 4,942,564 | 7/1990 | Hofer et al. | 369/44.35 |
| 5,014,256 | 5/1991 | Horie et al. | 369/44.35 |
| 5,048,002 | 9/1991 | Horie et al. | 369/44.35 |
| 5,084,849 | 1/1992 | Ishii et al. | 369/44.35 |
| 5,097,458 | 3/1992 | Suzuki | 369/44.35 X |

*Primary Examiner*—Thang V. Tran
*Attorney, Agent, or Firm*—Morgan, Lewis and Bockius LLP

[57] ABSTRACT

An automatic gain control device includes: servo loop for performing servo control based on an error signal; gain control unit for controlling gain of the servo loop in accordance with gain control value; and storage unit for storing gain control values. The gain control unit starts gain control using the gain control value stored in the storage unit as default value with which the gain control is started, and stores the gain control value newly obtained by the gain control to the storage unit after the gain control is completed.

19 Claims, 9 Drawing Sheets

FIG. 8

| | | |
|---|---|---|
| 0000h | | |
| | A | :0800h |
| 1000h | | |
| | B | :1800h |
| 2000h | | |
| | C | :2800h |
| 3000h | | |
| | D | :3800h |
| 4000h | | |
| | E | :4800h |
| 5000h | | |
| | F | :5800h |
| 6000h | | |
| | G | :6800h |
| 7000h | | |
| | I | :7800h |
| 7FFFh | | |

DEVICE AND METHOD FOR AUTOMATICALLY CONTROLLING A SERVO LOOP GAIN

BACKGROUND OF THE INVENTION

1. Field of the Invention

This invention relates to an automatic gain control device, and more particularly to an improved technique of setting an initial gain value used for gain control in a servo control device installed in an optical information recording and reproducing device.

2. Description of the Prior Art

Normally, in a device for recording or reproducing information on or from a disc such as a Compact Disc or a Laser Disc, servo control technique is very important for accurately read out information recorded on a disc. Servo control circuit generally includes a closed servo loop for feeding back information relating to a relative speed of a pickup for reading information with respect to the disc, information relating to a position of the pickup with respect to tracks or information relating to focusing condition of objective lens. In such a servo control technique, an error signal is generated based on a read-out signal from the pickup, and it is necessary to control gain of the servo loop so that the error signal becomes an appropriate voltage level. For this reason, an automatic gain control circuit is frequently provided in the servo control device, and particularly an automatic gain control utilizing a disturbance source is known. Such an automatic gain control is advantageous in that an appropriate gain control value for the device can be measured, and servo control device with such a gain control can perform stable servo control by an automatic gain control to set appropriate loop gain prior to the reproduction.

FIG. 1 is a flowchart illustrating an operation of general automatic gain control. Firstly, when a reproduction device such as a CD player is switched on (step S51), an initial gain value is set to an attenuator provided in the servo loop by a microcomputer (step S52). The gain control value initially set to the attenuator prior to automatic gain control is hereinafter referred to as "default value". The default value is generally determined so that loop gain of servo loop becomes 0 dB. In response, the attenuator amplifies error signal input thereto with the gain thus set and outputs it. An automatic gain controller receives feed-back error signal which has traveled through the closed servo loop, and starts automatic gain control (step S53). The automatic gain controller detects gain of the servo loop, calculates an appropriate gain control values of the attenuator and sets them to the attenuator. Then, the automatic gain controller terminates the automatic gain control (step S54). When the appropriate gain control values of the servo loop circuits are determined, a head portion of CD is searched, issuing of mute signal for muting acoustic signal is stopped and the reproduction device starts playing music (step S55).

As described above, in a conventional automatic gain control utilizing a closed servo loop, the default value which is initially set before the gain control is constant and invariable irrespective of variation of condition of the information recording/reproducing device with the passage of time. On the other hand, a technique of varying default value according to differences of characteristics of each CDs has been proposed, in Japanese Laid-Open Patent Application 4-289520, in which appropriate default values are memorized for every CDs and the stored default value is used when the CD is set to a reproducing device.

However, in an automatic gain control device using an invariable default value, servo control cannot be stably performed, particularly in an initial period of control, due to variation of physical condition of the reproducing device with the passage of time or other factors. FIG. 2 is a diagram illustrating variation of loop gain of a closed servo-loop circuit according to the passage of time. As is apparent from FIG. 2, the loop gain of the servo-loop circuit varies, i.e., gradually decreases, according to the passage of time. One reason of the gain variation is that characteristics of mechanical components in a reproducing device varies year by year due to influences from condition or environment where the device is used, and the variation results in decreasing of the servo-loop gain. In a general pickup used in a CD player or a LD player, an objective lens is hanging movably using an elastic element for focus servo control, and the regular position of the objective lens gets lower as time passes. This may be one of a factor in variation of loop gain. Further, dynamic characteristics of the mechanical components vary due to corrosion or erosion of coil or rubbed portion of elements, and thereby gain of servo loop decreases. Still further, characteristics of the components are varied due to variation of temperature or humidity in seasons, and hence the loop gain may be affected. Due to factors described above, loop gain of the servo-loop circuit varies as a whole, as illustrated in FIG. 2. In FIG. 2, gain of attenuator can be adjusted by fine control of the automatic gain controller if the automatic gain control is started with the invariable default value in the area A. However, if the automatic gain control is started with the invariable default value in the area B where variation of the loop gain becomes out of the servo followable range (dotted line), the servo-loop can no longer close and automatic gain control cannot carried out. Although such problems can be eliminated by using components or elements resistant to changes of conditions with the passage of time without restriction of size or cost, it is difficult to achieve in actuality.

On the other hand, the above-mentioned technique of individually storing default values for each CDs cannot overcome the variation of characteristics with the passage of time that occurs even if the same CD is repeatedly reproduced, although it can compensate for the differences in characteristics between CDs. Generally, variation of characteristics of mechanical component according to the passage of time may largely affect the control of the device than differences in characteristics of each CDs, which are standardized products, especially in a case of equipments for business use which are used for a long time or provided with a lens relatively easily stained.

SUMMARY OF THE INVENTION

It is an object of the present invention to provide an automatic gain control device capable of performing stable servo control even if it is used in various conditions or environments and for a long time.

According to one aspect of the present invention, there is provided an automatic gain control device including: servo loop for performing servo control based on an error signal; gain control unit for controlling gain of the servo loop in accordance with gain control value; and storage unit for storing gain control values. The gain control unit starts gain control using the gain control value stored in the storage unit as default value with which the gain control is started, and stores the gain control value newly obtained by the gain control to the storage unit after the gain control is completed.

According to another aspect of the present invention, there is provided an automatic gain control device including: servo loop for performing servo control based on an error signal; gain control unit for controlling gain of the servo loop in accordance with gain control value; storage unit for storing gain control values; and table storage unit for storing correspondences between the gain control values and default values with which the gain control is started. The gain control unit starts gain control using the default value corresponding to the gain control value stored in the storage unit, and stores the gain control value newly obtained by the gain control to the storage means after the gain control is completed.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 8 is a diagram illustrating a contents of table storing default values.

DESCRIPTION OF THE PREFERRED EMBODIMENT

Preferred embodiments of the present invention will be described below with reference to the accompanying drawings.

1st Embodiment

Figure 3:
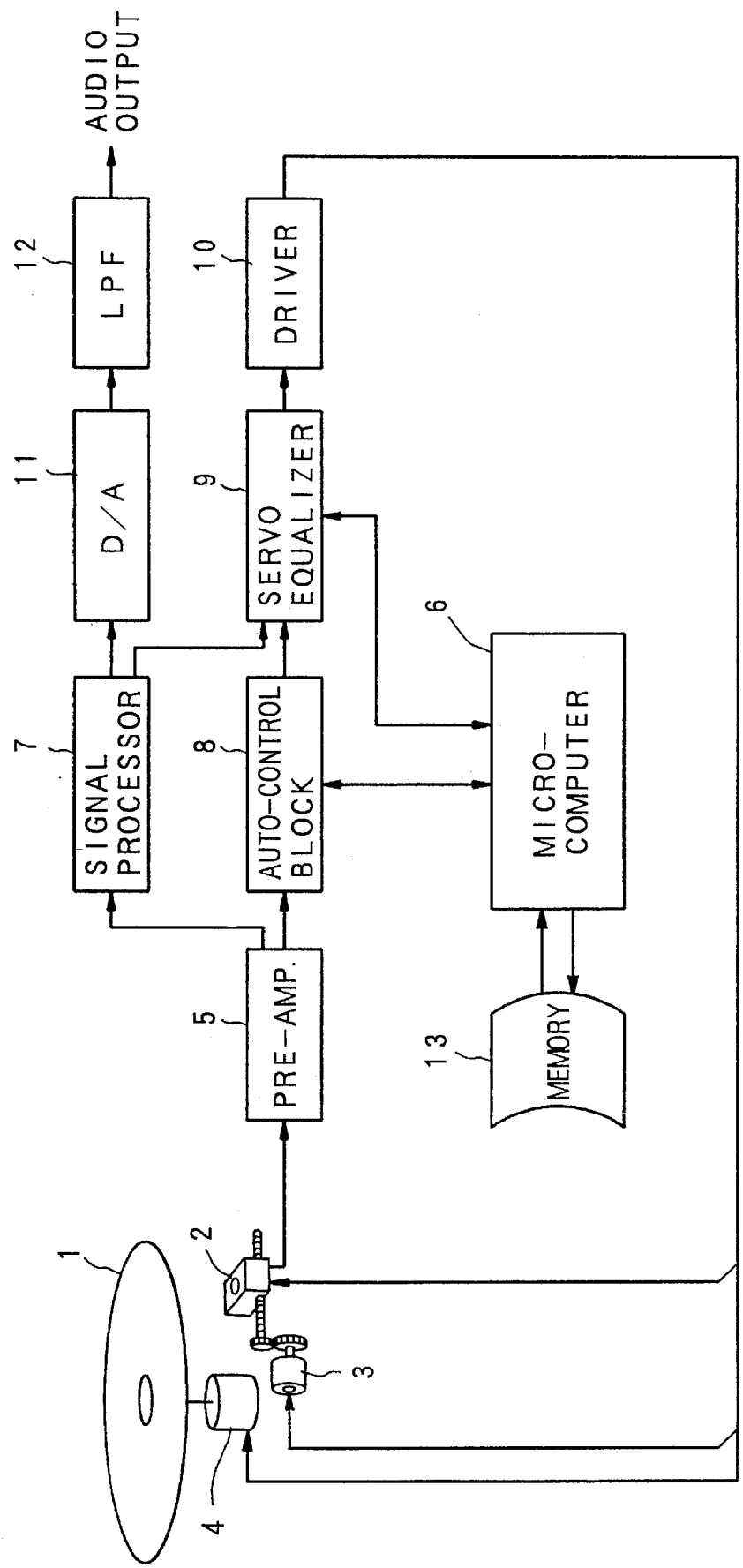
FIG. 3 is a block diagram illustrating a construction of servo system of a CD player according to the present invention.

FIG. 3 is a block diagram illustrating a construction of servo system of a CD player according to the present invention. The CD player includes a disc 1, a pickup 2, a carriage motor 3, a spindle motor 4, a pre-amplifier 5, a signal processor 7, a D/A converter 11 and a low-pass filter (LPF) 12. These components mainly relates to audio signal demodulation. The disc 1 is a recording medium on which signal is recorded, and the pickup 2 reads out signal from information tracks on the disc 1 via an objective lens (not shown). The carriage motor 3 transfers the pickup 2 in a radial direction of the disc 1, and the spindle motor 4 rotates the disc 1. The pre-amplifier 5 amplifies a signal read-out by the pickup 2, and outputs a focus error signal and a tracking error signal in addition to a binary RF signal. The signal processor 7 generates a CLV signal for controlling linear velocity of the spindle motor 4 based on the binary RF signal, carries out EFM modulation and error correction according to CIRC (Cross Interleave Reed-Solomon Code) onto the RF signal to produce 16-bits digital signal, and supplies it to the D/A converter 11. The D/A converter 11 converts the 16-bits digital signal to an analog signal, and the low-pass filter 12 eliminates noise component from the analog signal and passes only audio signal of audible frequency. The CD player further includes an automatic gain control block 8, a servo equalizer 9, a driver 10, a micro-computer 6 and a memory 13. These components function servo control. The automatic gain control block 8 varies levels of the error signals supplied from the preamplifier 5 to be predetermined signal levels suitable for the servo control, and the servo equalizer 9 adjusts frequency for servo control. The driver 10 carries out current-amplification of the drive signals generated, and drives focus and tracking coils (not shown) in the pickup 2, the carriage motor 3 and the spindle motor 4. The micro-computer 6 controls whole system, and the memory 13 stores gain control values used in previous controls as default values to be used for control of next time. The object lens of the pickup 2 is driven by the tracking coil in the radial direction of the disc, and driven by the focus coil to perform focus control. By these servo controls, the pickup 2 is positioned to accurately receive read-out light from the disc 1 and supplies the light to a photo-detecting unit (not shown).

Figure 1:
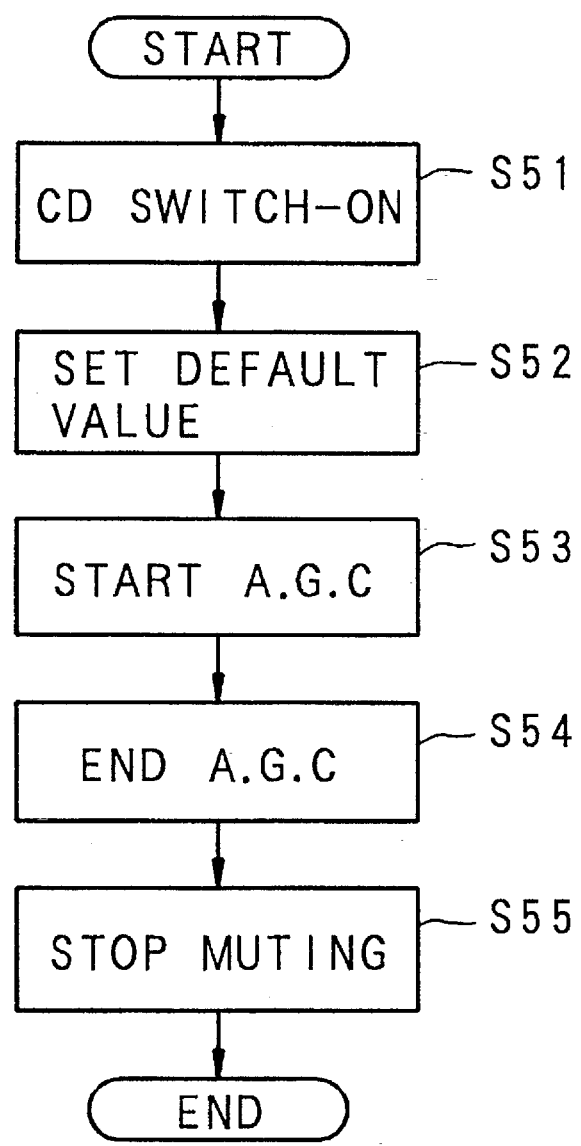
FIG. 1 is a flowchart illustrating an operation of general automatic gain control.
Figure 4:
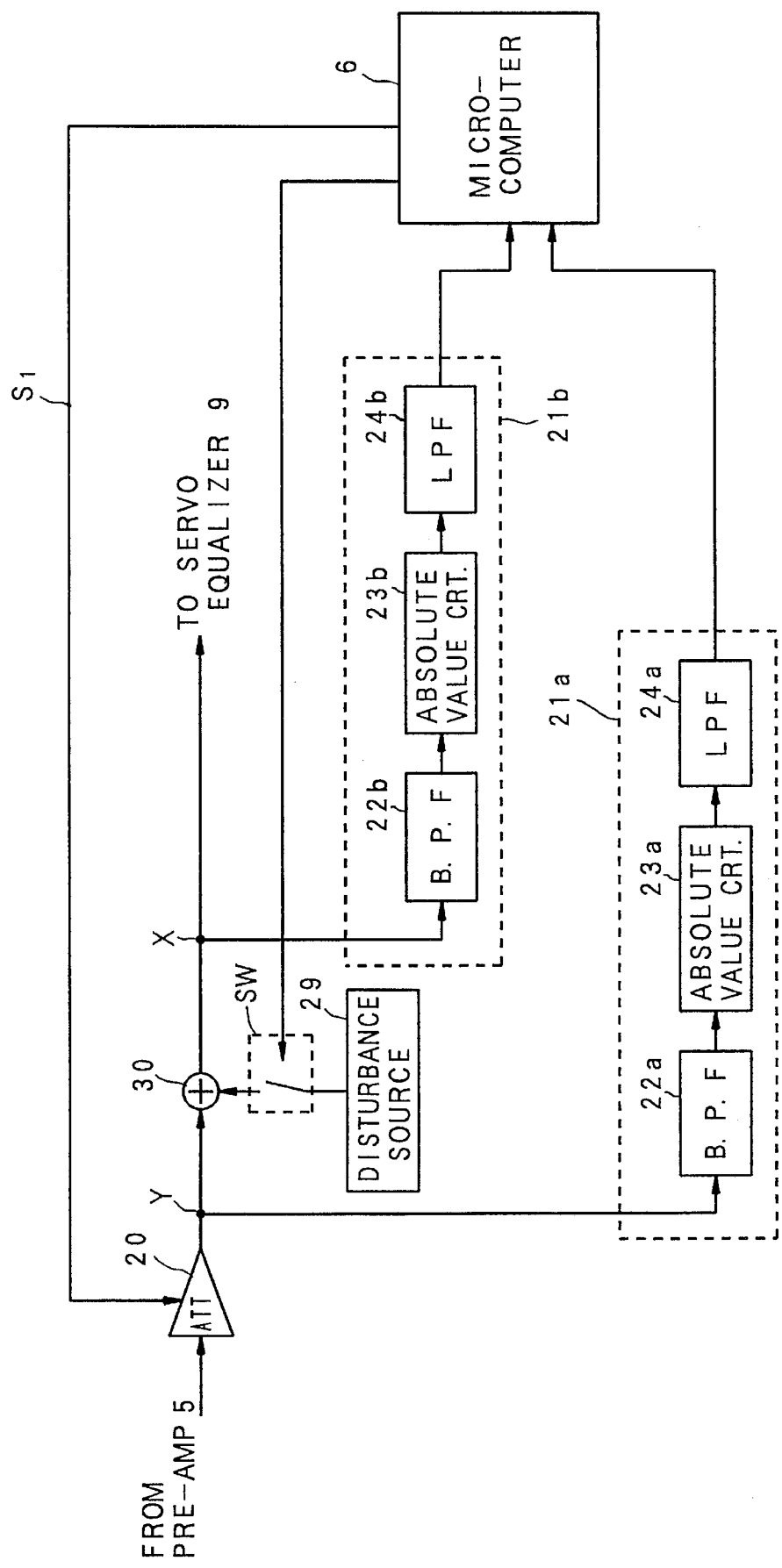
FIG. 4 is a block diagram illustrating a construction of the automatic gain control block.

FIG. 4 is a block diagram illustrating a construction of the automatic gain control block 8. The automatic gain control block 8 varies the levels of the error signals supplied from the pre-amplifier 5 to be appropriate for the servo equalizer 9. The automatic gain control block 8 includes an attenuator 20, a gain detecting block 21a, a gain detecting block 21b, a disturbance source 29 and an adder 30. The attenuator 20 varies levels of the error signals on the basis of the attenuator control signal $S_1$ supplied from the micro-computer 6. The attenuator control signal $S_1$ includes gain control signal, and the micro-computer 6 supplies a gain control signal to the attenuator 20 by the attenuator control signal $S_1$. It is noted that the gain control signal supplied to the attenuator 20 prior to the commence of the automatic gain control is the default signal. Namely, the micro-computer 6 supplies the default value to the attenuator 20 before the automatic gain control, and supplies gain control values obtained during the automatic gain control. The gain detecting block 21a receives the output of the attenuator 20 from the terminal point Y positioned between the attenuator 20 and the adder 30, and detects the level of the error signal, including disturbance signal, which has traveled through the servo loop shown in FIG. 1. The adder 30 adds the disturbance signal generated by the disturbance source 29 to the output from the attenuator 20. The gain detecting block 21b receives the output of the adder 30, and detects levels of the error signals immediately after the addition of the disturbance signal. The disturbance source 29 generates disturbance signal having pseudo-constant value (e.g., oscillation signal having constant frequency and constant magnitude level) to be added to the error signal, and supplies the disturbance signal to the adder 30 via the switch SW switched by the micro-computer 6. The gain detecting block 21a includes a band-pass filter 22a for extracting the signal having frequency of the disturbance signal component, an absolute value calculation circuit 23a for producing absolute value signal and a low-pass filter 24a for eliminating signal having frequency of the disturbance signal to produce D.C. component signal. The gain detecting block 21b has a similar construction as that of the gain detecting block 21a, and includes a band-pass filter 22b, an absolute value calculating circuit 23b and a low-pass filter 24b. Namely, the gain detecting block 21a detects the level of the disturbance signal component which has traveled through the servo loop, and the gain detecting block 21b detects level of the disturbance signal component from the disturbance source 29. In other words, the disturbance signal functions as a reference signal based on which gain of the servo loop is detected.

Figure 5:
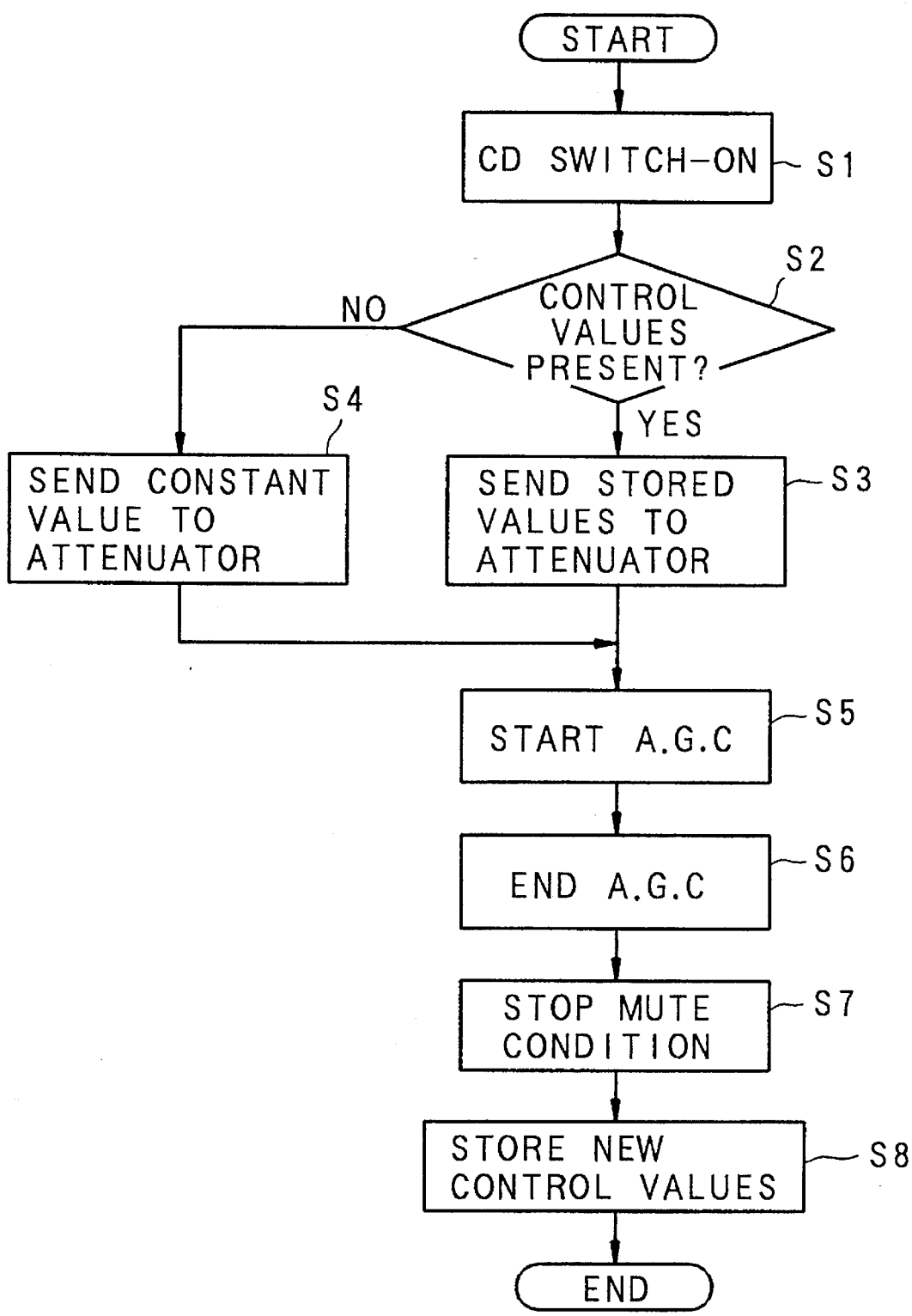
FIG. 5 is a flowchart illustrating an operation of the first embodiment of the present invention.

Next, an operation of this embodiment will be described with reference to FIG. 5. FIG. 5 is a flowchart illustrating an operation of the first embodiment of the present invention. Firstly, when the CD player is switched on (step S1), the micro-computer 6 examines a predetermined address of the memory 13 to discriminate whether previous gain control values have been stored or not (step S2). The memory 13 may be a Static-RAM (SRAM) utilizing a super-capacitor or a battery for backup power supply. Therefore, if gain control values used in previous operation are stored in the memory 13, they are maintained and may be used for next operation even if main power supply has been cut off. If information at the predetermined address is indefinite or invalid and is not correctly stored (step S2:NO), the micro-computer 6 recognizes that it is new operation (at the first time after the memory is cleared) or contents of the memory 13 is destroyed because of some factors such as noise, and supplies a constant gain control value (constant default value) to the attenuator 20 (step S4). If it is detected that some gain control values are effectively stored in the memory 13 (step S2:YES), the microcomputer 6 transmits one of the previous gain control values stored in the address (e.g., newest one) to the attenuator 20 as a default value used for the following automatic gain control (step S3). Here, the gain control value includes a focus-servo control value (F) and a tracking servo control value (T), and they may be stored in separate storage areas in the memory 13. When the default value is thus set, an automatic gain control is started (step S5). In the automatic gain control, the gain control value of the attenuator 20 is finely adjusted and renewed by referring to the level of the disturbance signal component. Details of the automatic gain control will be described later. When the automatic gain control is completed (step S6), the micro-computer 6 stops issuing a mute signal for preventing de-quantized audio signal from being supplied to the audio reproducing system and starts reproduction of the audio signal (step S7). Then, the micro-computer 6 stores the new gain control values for the focus-servo and tracking-servo, which are obtained by the automatic gain control, in steps S5 and S6 into the memory at appropriate addresses, and ends the operation (step S8). The new gain control values thus stored in the memory 13 is read out and used as default values in the automatic gain control of next time.

Figure 6:
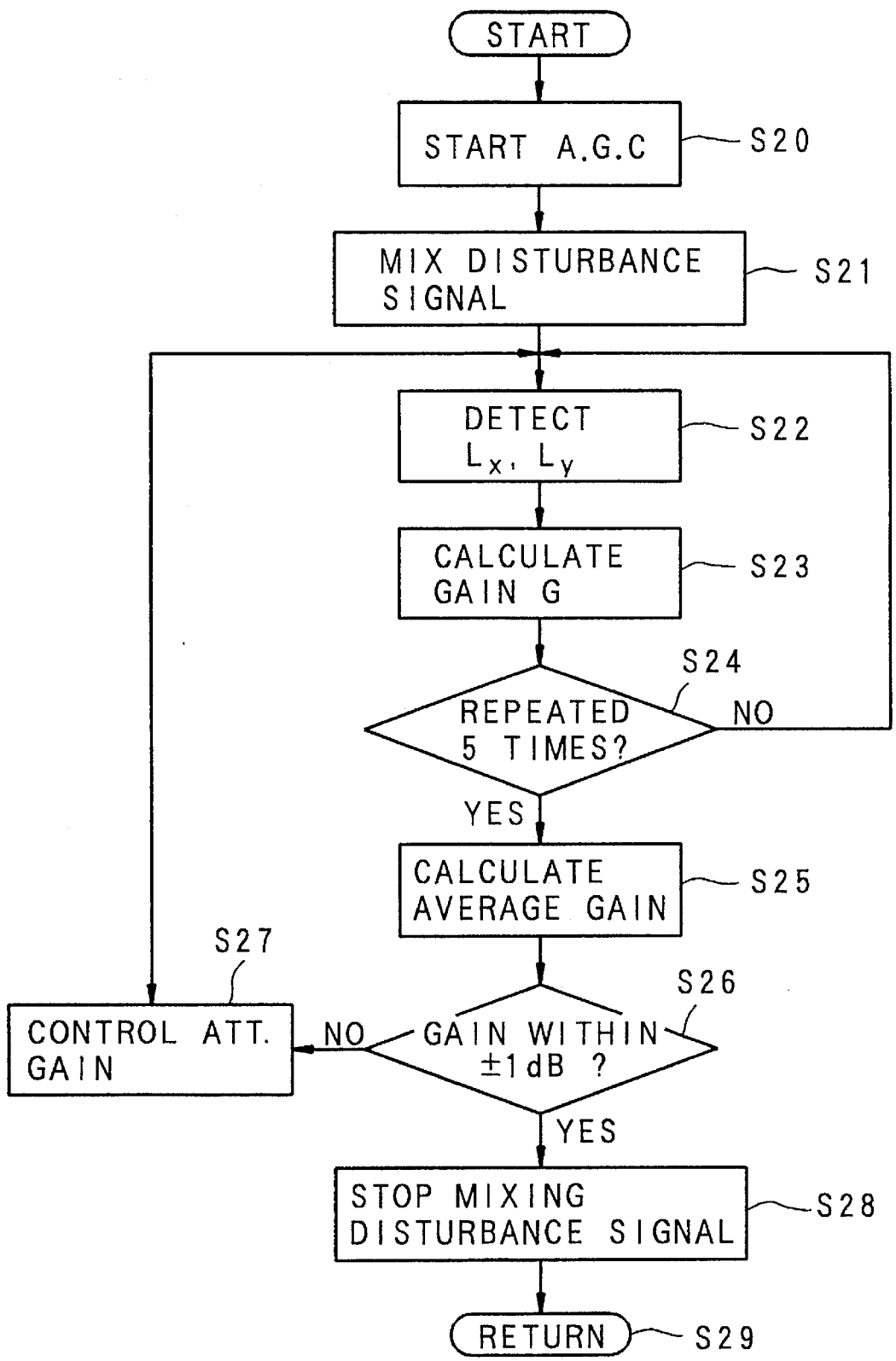
FIG. 6 is a flowchart illustrating operation of the automatic gain control according to the first embodiment.

Next, the automatic gain control will be described in more detail. FIG. 6 is a flowchart illustrating operation of the automatic gain control. Firstly, the micro-computer 6 turns on the switch SW to supply the disturbance signal to the adder 30 (step S21). Then, the gain detecting block 21b receives, from the terminal point X, the error signal to which the disturbance signal is mixed, and the micro-computer 6 receives output of the gain detecting block 21b and detects the level $L_X$ of the disturbance signal (step S22). Simultaneously, the output of the adder 30 is supplied to the servo equalizer 9, and then delivered to the pickup 2 via the driver 10. The objective lens in the pickup 2 slightly fluctuates according to the disturbance signal. Since the level of the error signal varies non-linearly dependent upon an offset measured from the lens center of the pickup 2, the level of the error signal varies according to the fluctuation. The error signal returns to the automatic gain control block 8 via the pre-amplifier 5. Here, the gain control value set in the attenuator 20 is the default value set by the micro-computer 6 in step S6, that is, the value read out from the memory 13. The gain detecting block 21a examines the error signal traveled through the servo loop and reached the terminal point Y, and detects the level $L_Y$ of the disturbance signal in the error signal (step S22). The disturbance source 29 generates oscillation signal of a constant frequency and a constant magnitude level, and the band-pass filters 22a and 22b extract signal having the frequency of the disturbance signal. Therefore, only the signal of the disturbance signal frequency is detected in the gain detecting blocks 21a and 21b even if the error signal includes signal component of other frequency. The gain G of the servo loop is calculated, from the level $L_X$ of the disturbance signal obtained by the gain detecting block 21b and the level $L_Y$ of the disturbance signal obtained by the gain detecting block 21a, according to the following equation:

$$G = L_Y/L_X.$$

These values $L_X$ and $L_Y$ are stored in the memory 13. Then, the above gain calculation in step S22 is repeated for a plurality of times (5 times in this embodiment), and the number of repetition is counted (step S23). When the gain calculation is carried out once, the counter increments the counting number by one. When the gain calculation is carried out for a predetermined times (step S24:YES), the micro-computer 6 reads out the gain values thus calculated from the memory 13 and takes an average of them (step S25). It is known by experiments that, in order to perform stable servo control, variation of loop gain should be suppressed within a range of ±1 dB. In this view, loop gain thus averaged is examined, and if the loop gain is out of the range of ±1 dB (step S26:NO), the gain of the attenuator 20 is varied so that the loop gain becomes within the range of ±1 dB (step S27), and steps S22 to S26 are repeated. If the loop gain is within the range of ±1 dB (step S26:YES), the micro-computer 6 turns off the switch SW to terminate mixing the disturbance signal (step S28), and the operation goes to step S7 shown in FIG. 5 (step S29). When the loop gain becomes within the range of ±1 dB, the gain control values at this time is stored in the memory 13 as new gain control values which will be used as default values in the automatic gain control of next time.

As described above, according to the first embodiment, gain control value recently obtained is read out from a non-volatile memory and used as a default value for the automatic gain control. Therefore, the servo loop can be surely closed. Further, the stored gain control values are safely maintained even if main D.C. supply of the reproduction device is cut off, the stored value can be read out next time. Still further, even if the stored value is indefinite or invalid, the gain control is performed based on a constant default value.

2nd Embodiment

In the second embodiment, gain control value is grouped into a plurality of groups, and a gain control value representative of the group is supplied to the attenuator as default value for the automatic gain control. Specifically, default values corresponding to each of the groups are stored in a table, and a default value to be supplied to the attenuator is determined from the gain control value stored in the memory 13, by referring to the table.

Figure 7:
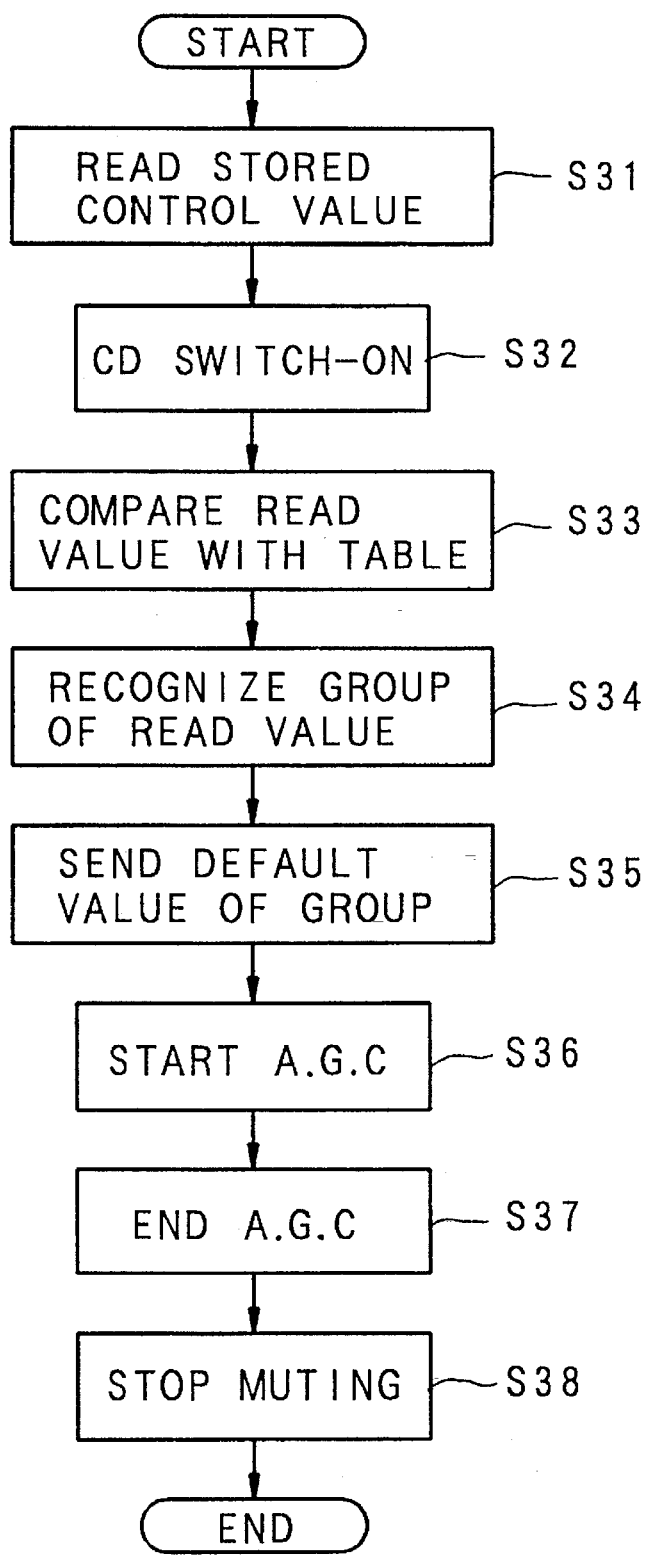
FIG. 7 is a flowchart illustrating an operation of the automatic gain control device according to the second embodiment.

The device according to the second embodiment has the same construction as the device according to the first embodiment, therefore description thereof will be omitted. An operation of the device according to the second embodiment will be described with reference to FIGS. 7 and 8. FIG. 7 is a flowchart illustrating an operation of the automatic gain control device according to the second embodiment, and FIG. 8 is a diagram illustrating a contents of table storing default values. As shown in FIG. 8, gain control values (0000h 7FFFh, h:hexadecimal) are divided into a plurality of groups A–E, and default values (0800h–7800h) are assigned to the groups. For example, if gain control value is "3B80h", the micro-computer 6 recognizes that the gain control value belongs to the group D and delivers the default value "3800h" to the attenuator 20. The table may be stored in a ROM or the like provided in the micro-computer 6.

Next, an operation of the automatic gain control will be described. It is assumed that the memory 13 is holding gain control values previously used (step S31). When the CD player is switched on (step S32), the micro-computer 6 reads out gain control value previously stored in the memory 13, compares the read out gain control value with gain control values in the table (step S33), and discriminates to which one of the groups A–E the read-out gain control value belongs (step S34). Then, the micro-computer 6 delivers, to the attenuator 20, the default value corresponding to the group to which the gain control value thus read-out belongs, as an initial gain control value with which automatic gain control is started. Then, the automatic gain control block 8 starts automatic gain control in a manner similar to that in the first embodiment (step S36). When the automatic gain control ends, the micro-computer 6 stores the gain control value obtained in step S36 into the memory 13 (step S37). Then, issuing the mute signal is stopped and audio reproduction is started (step S38).

As described above, according to the second embodiment, the micro-computer 6 can readily determine default value to be set to the attenuator 20 based on the gain control value by referring to the table. Further, the device can be readily applied to many types of reproduction devices because the contents of the table can be easily altered by simply changing the ROM.

3rd Embodiment

In the third embodiment, if the servo loop cannot close by setting new default value to the attenuator, in the manners of the first or second embodiments, the default value is varied to close the servo loop. The CD player according to the third embodiment has the same construction as the first embodiment, and therefore description thereof will be omitted.

Figure 2:
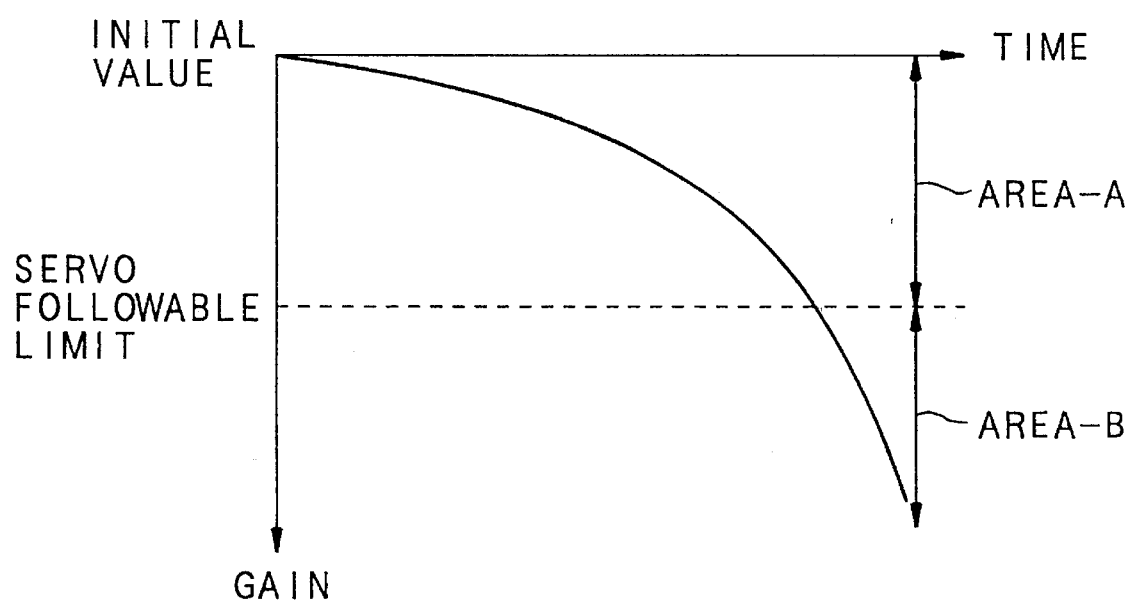
FIG. 2 is a diagram illustrating variation of loop gain of a closed servo-loop circuit with the passage of time.
Figure 9:
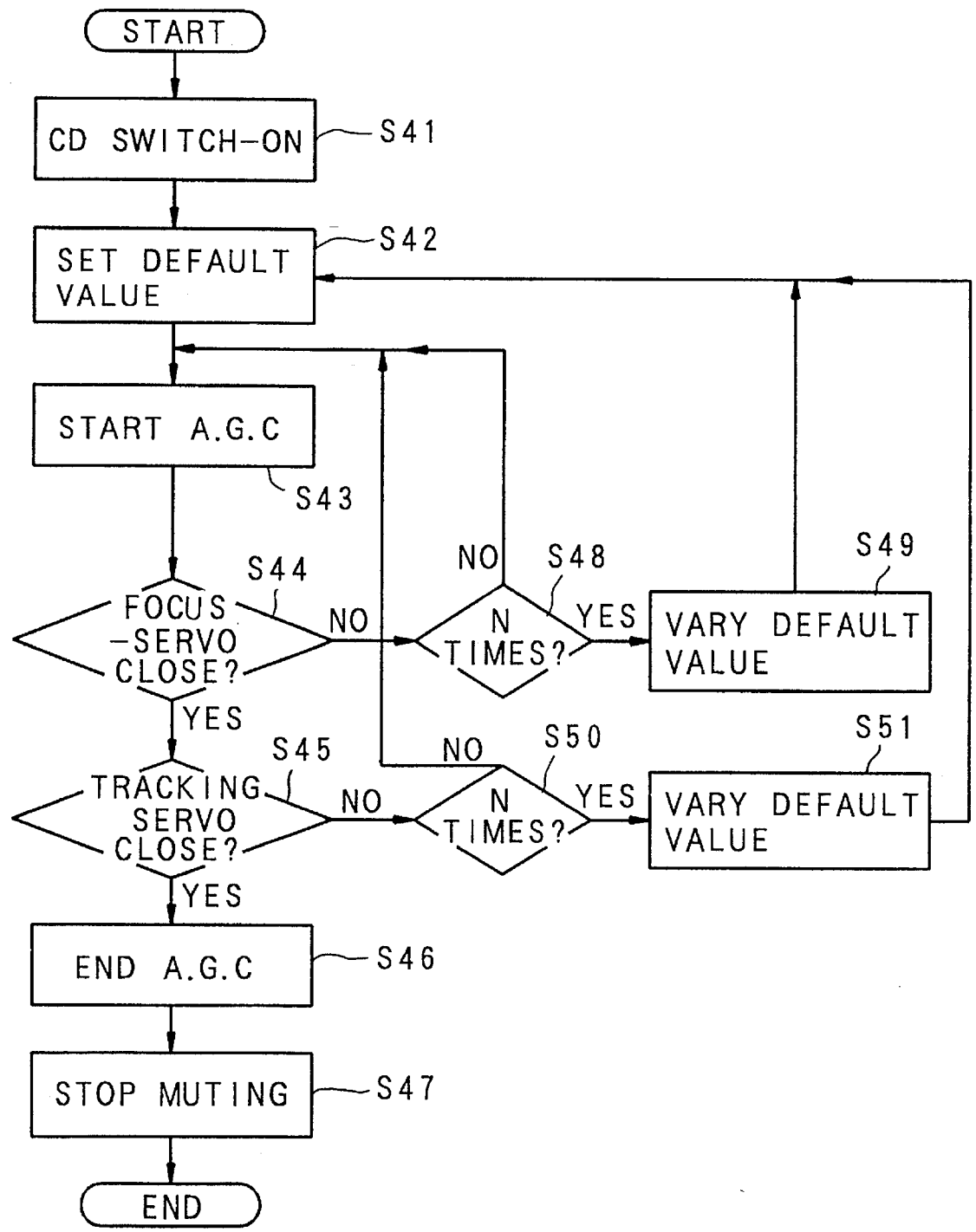
FIG. 9 is a flowchart illustrating an operation of the third embodiment.

An operation of the automatic gain control will be described with reference to FIG. 9. FIG. 9 is a flowchart illustrating an operation of the third embodiment. Firstly, the CD player is switched on (step S41), and a default value is determined according to the manner of the first or the second embodiments (step S42). Then, the automatic gain control is started (step S43), and it is determined whether the focus-servo loop and tracking servo loop are closed or not (steps S44 and S45). If both of the loops are closed (step S44 and S45:YES), the automatic gain control is terminated (step S46), and audio reproduction begins (step S47). However, in some cases, servo loops cannot be closed, due to variation of condition or environment, even if a new default value is set to the attenuator 20. If the focus-servo is not closed (step S44:NO), the micro-computer retries servo-closing operation for N (arbitrary number) times, with counting up the number of repetition (step S48). If the focus-servo cannot be closed after the N-times repetition (step S48:YES), the default value is varied (step S49). The default value is varied by appropriate steps (e.g., value about 1000h in the case using the table shown in FIG. 8). Direction of variation, i.e., positive or negative, is determined by judging as to which direction the gain of the servo loop detected by the auto gain control should be altered. Gain of the servo loop varies in a negative direction in a manner of naturalized logarithm due to the passage of time, as shown in FIG. 2, and hence the variation of the servo loop gain can be forecasted from the relation between an initial value and detected servo loop gain of the previous operation. Similar trials are carried out N-times for the tracking-servo loop (step S50), and if the tracking servo loop is not closed nevertheless (step S50:YES), default values of the tracking servo loop is varied in the same manner as the focus servo loop (step S51).

As described above, according to the third embodiment, servo loop can be closed even if the loop gain becomes out of the followable range because the default values are varied. In addition, if the default value is repeatedly renewed according to the operation of the first embodiment, loop gain can be easily set to be within the followable range.

Other Modifications

The present invention can be modified in various ways. For example, in a case where new gain control value to be set to the attenuator, obtained by the automatic gain control, is not greatly different from the default value, following automatic gain control may be omitted. Further, if an irregular gain control value is obtained due to defects or the like on the disc, and if the irregular value is stored in the memory, such an irregular value may be eliminated by limiting or omitting it when read out from the memory.

In the above described embodiments, the memory stores the gain control values of a previous operation. However, the memory may further store values prior to the previous operation using a plurality of buffers or a ring-buffer. In this case, an average of the stored values may be used as default value, or an average of the stored values except for the above-mentioned irregular values may be used as default value. By doing so, irregular values obtained by reproduction of abnormal CD may be eliminated. The present invention is not only applicable to servo control device utilizing disturbance source but also applicable to other types of servo control device, e.g., device determines servo gain by examining recording reference signal itself.

As described above, according to the present invention, gain control value used in previous control is used as a default value in the next control. Therefore, the servo loop can be stably closed even if loop gain is varied due to variation of condition with the passage of time, such as stained object lens or functional deterioration of mechanical elements.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. An automatic gain control device comprising:
   servo loop for performing servo control based on an error signal;
   gain control means for controlling a gain of the servo loop in accordance with a gain control value; and
   storage means for storing gain control values, wherein said gain control means starts gain control using the gain control value stored in the storage means as a default value with which the gain control is started, and stores a gain control value newly obtained by the gain control to the storage means after the gain control is completed,
   wherein the automatic gain control device further comprises means for calculating an average of the gain control values stored in the storage means, and wherein said gain control means uses the average as the default value.

2. An automatic gain control device according to claim 1, further comprising a disturbance source for generating a disturbance signal and mixing the disturbance signal with the error signal; and
   gain detecting means for detecting the gain of the servo loop on the basis of a level of the disturbance signal.

3. An automatic gain control device according to claim 1, wherein said gain control means utilizes a gain control value most recently stored in the storage means as the default value.

4. An automatic gain control device according to claim 1, further comprising means for varying the default value when the servo loop is not closed by the default value initially used.

5. An automatic gain control device comprising:
   a servo loop for performing servo control based on an error signal;
   gain control means for controlling a gain of the servo loop in accordance with a gain control value;
   storage means for storing gain control values; and
   table storage means for storing correspondences between the gain control values and default values with which the gain control is started, wherein said gain control means starts gain control using a default value corresponding to the gain control value stored in the storage means, and stores a gain control value newly obtained by the gain control to the storage means after the gain control is completed.

6. An automatic gain control device according to claim 6, further comprising a disturbance source for generating a disturbance signal and mixing the disturbance signal with the error signal; and gain detecting mean for detecting the gain of the servo loop on the basis of a level of the disturbance signal.

7. An automatic gain control device according to claim 5, further comprising means for varying the default value when the servo loop is not closed by the default value initially used.

8. A device for automatically controlling a gain of a servo loop, comprising:
   a memory; and
   automatic gain control means for performing an automatic gain control operation by producing a new gain control value from a default gain control value stored in the memory, controlling the gain of the servo loop in accordance with the new gain control value, and storing the new gain control value in the memory,
   wherein the automatic gain control means uses the new gain control value as the default gain control value when repeating the automatic gain control operation to perform a subsequent automatic gain control operation.

9. The device according to claim 8, wherein the automatic gain control means comprises:
   a disturbance source for generating a disturbance signal; and
   gain detecting means for detecting a gain of the servo loop by comparing a level of the disturbance signal after the disturbance signal has traveled through the servo loop with a level of the disturbance signal before the disturbance signal has traveled through the servo loop.

10. The device according to claim 9, wherein the gain detecting means includes:
    a first gain detecting block for detecting the level of the disturbance signal after the disturbance signal has traveled through the servo loop;
    a second gain detecting block for detecting the level of the disturbance signal before the disturbance signal has traveled through the servo loop; and
    a micro-computer for comparing the level of the disturbance signal after the disturbance signal has traveled through the servo loop with the level of the disturbance signal before the disturbance signal has traveled through the servo loop.

11. The device according to claim 10, wherein each of the first and second gain detecting blocks includes a band-pass filter, an absolute value calculation circuit, and a low-pass filter.

12. The device according to claim 8, wherein the automatic gain control means performs the automatic gain control operation by producing a plurality of new gain control values from the default gain control value stored in the memory, controlling the gain of the servo loop in accordance with an average of the new gain control values, and storing the average of the new gain control values in the memory, and
    wherein the automatic gain control means uses the average of the new gain control values as the default gain control value when performing the subsequent automatic gain control operation.

13. The device according to claim 8, further comprising:
    servo loop detecting means for detecting whether the servo loop is open or closed upon completion of the automatic gain control operation by the automatic gain control means; and
    varying means for varying the default gain control value when the servo loop detecting means detects that the servo loop is open.

14. The device according to claim 13, wherein the varying means varies the default gain control value by a predetermined amount.

15. A method for automatically controlling a gain of a servo loop, comprising the steps of:
    performing an automatic gain control operation by producing a new gain control value from a default gain control value stored in a memory, controlling the gain of the servo loop in accordance with the new gain control value, and storing the new gain control value in the memory; and
    using the new gain control value as the default gain control value when repeating the automatic gain control operation to perform a subsequent automatic gain control operation.

16. The method according to claim 15, further comprising the steps of:

generating a disturbance signal; and detecting a gain of the servo loop by comparing a level of the disturbance signal after the disturbance signal has traveled through the servo loop with a level of the disturbance signal before the disturbance signal has traveled through the servo loop.

17. The method according to claim 15, wherein the automatic gain control operation is performed by producing a plurality of new gain control values from the default gain control value stored in the memory, controlling the gain of the servo loop in accordance with an average of the new gain control values, and storing the average of the new gain control values in the memory, and wherein the average of the new gain control values are used as the default gain control value when performing the subsequent automatic gain control operation.

18. The method according to claim 15, further comprising the steps of:

detecting whether the servo loop is open or closed upon completion of the automatic gain control operation; and varying the default gain control value when the servo loop is detected to be open.

19. The method according to claim 18, wherein the default gain control value is varied by a predetermined amount.

* * * * *